United States Patent
Herberger et al.

(10) Patent No.: US 9,524,715 B2
(45) Date of Patent: Dec. 20, 2016

(54) SYSTEM AND METHOD FOR CONTENT RECOGNITION IN PORTABLE DEVICES

(71) Applicants: Tilman Herberger, Dresden (DE); Titus Tost, Dresden (DE)

(72) Inventors: Tilman Herberger, Dresden (DE); Titus Tost, Dresden (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 304 days.

(21) Appl. No.: 13/728,088

(22) Filed: Dec. 27, 2012

(65) Prior Publication Data

US 2014/0012572 A1  Jan. 9, 2014

Related U.S. Application Data

(60) Provisional application No. 61/582,011, filed on Dec. 30, 2011.

(51) Int. Cl.
| | |
|---|---|
| *G10L 17/00* | (2013.01) |
| *G10L 15/08* | (2006.01) |
| *G06F 17/30* | (2006.01) |
| *G10L 25/54* | (2013.01) |

(52) U.S. Cl.
CPC ......... *G10L 15/08* (2013.01); *G06F 17/30743* (2013.01); *G10L 25/54* (2013.01)

(58) Field of Classification Search
CPC ........ G10L 19/00; G10L 19/018; G10L 17/00; G10L 17/26; G10L 15/00; G10L 15/06
USPC ......................... 704/231, 246, 250, 255, 500
See application file for complete search history.

(56) References Cited

U.S. PATENT DOCUMENTS

| | | | |
|---|---|---|---|
| 2004/0260682 A1* | 12/2004 | Herley et al. | 707/3 |
| 2007/0242826 A1* | 10/2007 | Rassool | 380/201 |
| 2009/0268882 A1* | 10/2009 | Lee | H04M 3/5158 379/88.02 |
| 2010/0023328 A1* | 1/2010 | Griffin et al. | 704/231 |
| 2013/0110921 A1* | 5/2013 | Logan et al. | 709/204 |
| 2014/0289051 A1* | 9/2014 | Meiss | G06Q 30/0267 705/14.64 |

* cited by examiner

*Primary Examiner* — Qi Han

(74) *Attorney, Agent, or Firm* — Fellers, Snider, Blankenship, Bailey & Tippens, P.C.; Terry L. Watt

(57) ABSTRACT

According to a preferred aspect of the instant invention, there is provided a system and method for content recognition in portable devices. Content, preferably audio content is recorded by the instant invention, preferably a sample with a length between 1 and 10 seconds. A fingerprint will be generated from the recorded sample and automatically, and preferably without further user interaction, prompting, notification, etc. (e.g. invisible to the user), compared with the fingerprints in a fingerprint database that is stored locally in the portable device and the result thereafter presented to the user.

3 Claims, 3 Drawing Sheets

SYSTEM AND METHOD FOR CONTENT RECOGNITION IN PORTABLE DEVICES

This application claims the benefit of U.S. Provisional Patent Application Ser. No. 61/582,011 filed on Dec. 30, 2011 and incorporates said provisional application by reference into this document as if fully set out at this point.

FIELD OF THE INVENTION

The present invention relates generally to the field of content recognition and more particularly to the field of audio recognition.

BACKGROUND

Given that cheap computer storage is readily available, it is not uncommon for companies and end users to have accumulated hundred or thousands of digital music items on local or network disk. As such, audio recognition is an increasingly important way of keeping track of the stored digital audio data.

Audio recognition has found its way onto mobile, portable devices. It is commonplace to find applications that allow the user to record a sample of audio content and have it automatically identified. The standard approach to this recognition typically operates by sending the subject sample to a remote server, where the sample is analyzed and identified. The remote server then sends the identification data back to the user. This approach usually works very well, however it has certain drawbacks. For example, the owner of the remote identifying hardware may find it difficult to estimate the required remote server hardware requirements and such companies tend to spend more money on server architecture than is needed—"just to be safe". Additionally, even though bandwidth on portable devices has steadily decreased in price, the transmission of audio clips for identification, if performed via a cell phone link (as opposed to Wi-Fi), will be counted against the data plan allotment for that device. For devices that are not able to access a cell network, if Wi-Fi is not available, the identification operation will not be able to take place until the mobile device is brought in proximity to a Wi-Fi hot spot.

Thus, what is needed is a system and method that addresses the problems identified above. More particularly, it would be advantageous to have a system that is implementable on any kind of portable device, wherein the system does not need a constant connection to a remote server for content recognition.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for audio content recognition that executes within portable devices.

In a preferred embodiment, the instant invention will provide the user with an option to record/capture and identify content, preferably audio content, on a portable device. In some embodiment the user will be able to interact with a graphical user interface to control the specifics of the identification process.

In the recognition mode, however, the recognition will be preferably carried out automatically on the local device.

In a preferred arrangement, a user will initiate the recording or other capture of the audio material within the portable device. The instant invention will preferably record a short segment of audio content, for example between about 1 to 10 seconds, and during the recording phase the instant invention will attempt to identify the recorded content. Invisible to the user and according to a preferred embodiment, the instant invention will calculate a fingerprint of the recorded content and compare it with fingerprints that are stored in a fingerprint database that is resident on the portable device.

A multitude of individual usage scenarios for the instant invention are possible in addition to music recognition, ranging from identification of animal sounds (e.g. birds), the identification of music, to a couponing system that provides the user with bonus points when specific content has been recorded and identified by the user.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF EMBODIMENTS

Figure 1:
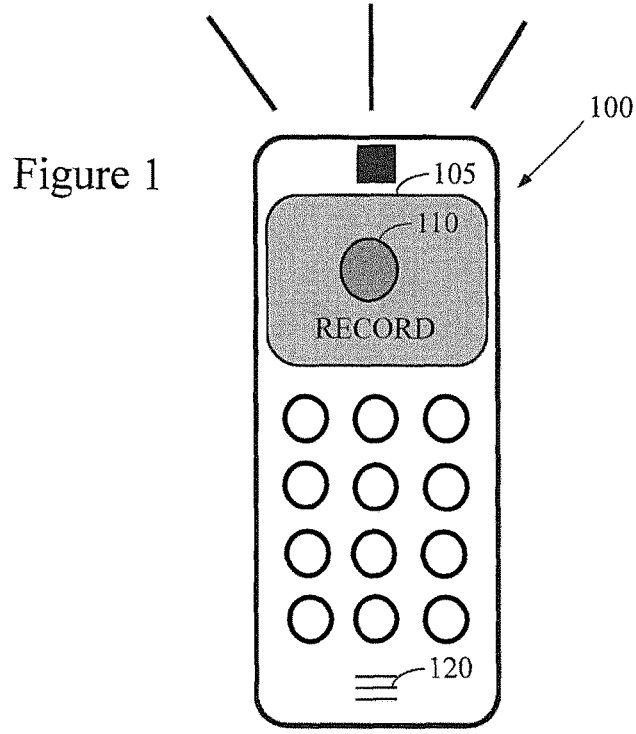
FIG. 1 depicts a preferred general working environment of the instant invention.

Referring now to the drawings, wherein reference numerals indicate the same parts throughout the several views, there is provided a preferred system and method for content recognition in portable devices.

As is generally indicated in FIG. 1, at least a portion of the instant invention will be implemented in form of software running on a users portable computing device 100 such as a cell phone, an MP3 player, hand held computer (e.g. a PDA), tablet computer, etc., having a display 105 integral thereto. Such a portable device will have some amount of program memory as is conventionally provided with such units. In FIG. 1, the portable device is shown as displaying a preferred first stage of the process of the instant invention, i.e., at the point where the record phase is about to be initiated. The user will preferably initiate the record phase by selecting an option (e.g., pressing an on-screen button 100 that is displayed on a touch sensitive screen 105) on the portable device.

The record operation will preferably take input be conducted via a built-in (or electronically attached) microphone 120. In the embodiment of FIG. 1, the microphone 120 is integral to the portable computing device 100, but that is not a requirement and other arrangements (e.g., a Bluetooth headset with a microphone) could be used instead.

In one embodiment, the process of the instant invention provides a user-friendly simplistic graphical user interface directed to streamlining and accelerating the process of content recognition on portable devices. In this embodiment the method utilizes no remote server connectivity during and for the content recognition process. Instead, a recognition or fingerprint database will be stored on the portable device and searches of that database will be performed locally, which eliminates the heavy computational and bandwidth load that would otherwise be placed on the remote server, thereby accelerating the process of content recognition. Those of ordinary skill in the art will recognize that a "fingerprint" is a condensed digital summary of information that has been generated from an audio file. As used herein, fingerprint should be broadly construed to be a plurality of characteristics of the audio work that are sufficient to identify that work with, in some cases, some probability of error. Preferably, the fingerprint will uniquely identify an audio work at least as compared with other fingerprints in the database.

The fingerprint of the recorded audio content will be determined (e.g., calculated) on the portable device and then compared with the contents of the fingerprint database to find a match. A wide range of different usage scenarios that incorporate the instant approach to content recognition are possible.

Figure 2:
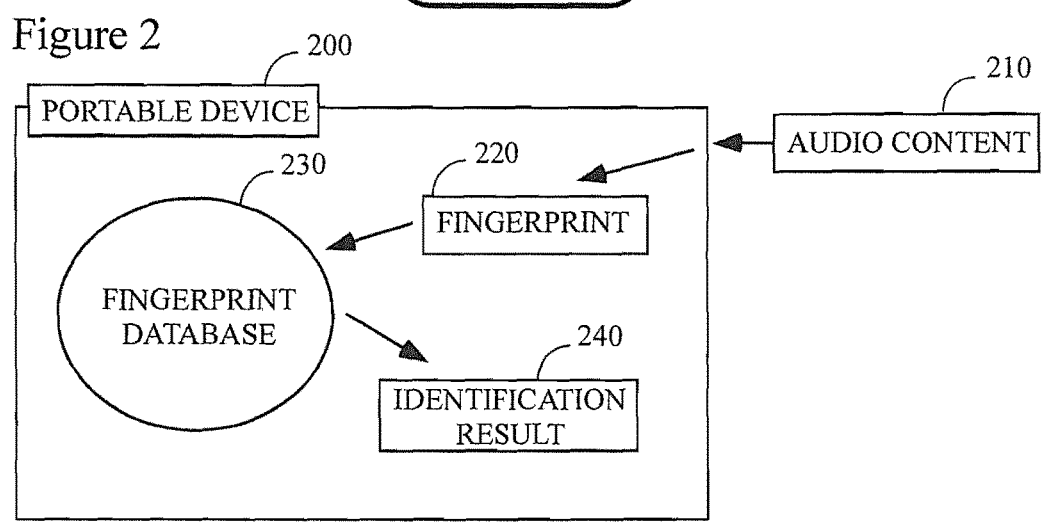
FIG. 2 illustrates an overview of the preferred contents of the system of the instant invention.

FIG. 2 contains a representative overview of an embodiment of the present invention that displays its major components. A portable computing device 200 will contain the content recognition and fingerprint database 230 used by the instant invention. Additionally there will be some amount of recorded content 210, where the content 210 will be some sort of audio, to include pure audio as well as video with an audio component.

During the process of capturing the input audio information 210, or after it has been captured, the instant invention will next preferably calculate a fingerprint 220 of that content. Next, and preferably, the calculated fingerprint 220 will then be compared with entries in the fingerprint database 230 that is stored on the portable device, the results of that comparison being thereafter provided to the user 240 or other requestor (depending on the usage scenario) that is associated with the content recognition process.

Figure 3:
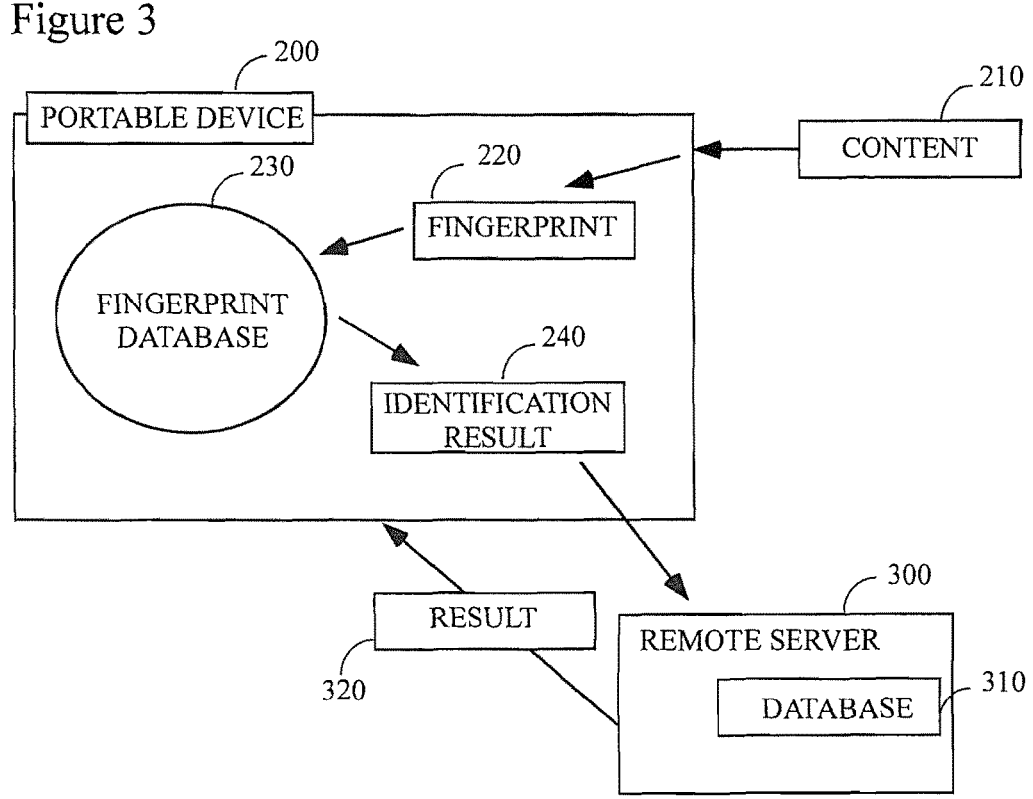
FIG. 3 illustrates a general workflow suitable for use with the instant invention.

FIG. 3 provides an overview of a preferred embodiment of the present invention that displays the individual sections used by the instant invention including its connectivity with an external connection. The portable device 200 will send the identification result 240 to a remote server 300 which will compare the identification result with a database 310 and the instant invention will send the result 320 back to the portable device 200. The form of the result might vary depending on the individual usage scenario; in a bonus/coupon detection usage scenario it might be possible that the remote server will send a notification to the portable device in response on the successful recording and identification of a specific advertisement or song.

Figure 4:
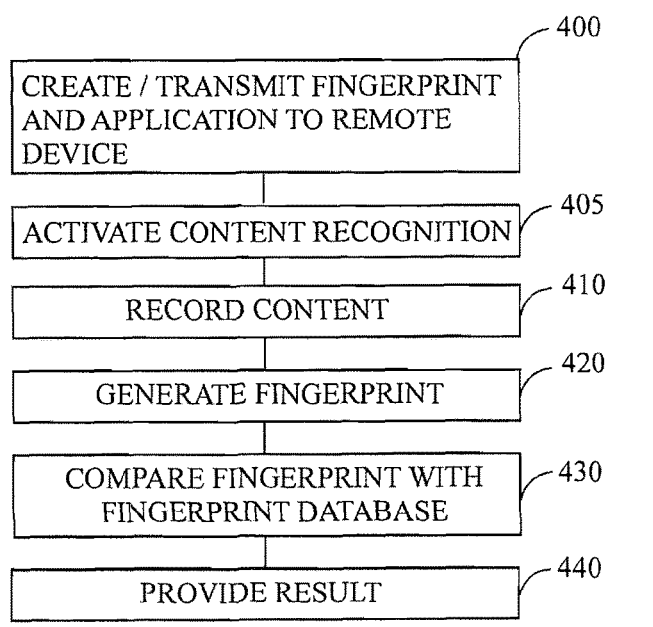
FIG. 4 shows a preferred graphical user interface of the instant invention as it might appear during the recording phase.

FIG. 4 provides a summary of a workflow that could be utilized by the instant invention in some embodiments. As a preferred initial step, the fingerprint database 230 that is to be resident on the mobile device 200 will be created on a remote server 300 according to methods well known to those of ordinary skill in the art. Obviously, a collection of the audio works that will most likely be encountered by the user will need to be assembled and analyzed to determine a fingerprint for each. Variables such as zero crossing rate, tempo, long or short term spectral characteristics (including average spectral values), pitch, key, a listing of the instruments that are present in the audio (to the extent that such can be identified), long or short term frequency bandwidth, whether vocals are present or not, whether the audio work is music, vocals and music, or spoken words only, etc., might be used in creating the fingerprint. Preferably, and as is generally indicated in FIG. 3, the fingerprints will be stored initially in a database on the remote server. In one embodiment, at the time the user loads a program that implements the instant invention on the portable device 200, all or part of the fingerprint database 310 will be transmitted there as well. In other instances, the implementing program will be loaded on the portable device 200 and, the first time it is activated, the fingerprint database 310 will be requested from the remote server 300 and loaded onto the device 200. In other embodiments, the local database will be periodically updated over a network connection with new/different fingerprints which might be added to the database from time to time. In this sort of variation, the server will calculate and transmit new fingerprints to the remote computing device, preferably when so requested. In other variations, the server will push new fingerprints out to the user by signaling that such are available. The user may or may not need to permit such a transmission, depending on the desires of the user and/or programmer. In still other variations, the instant invention will transmit instructions to remove fingerprints from the database or replace them with null records, etc.

Next, when the user is presented with audio material for which identification is requested, the user will activate the content recognition 405 option of the software that is on the portable device 200. Next, and preferably, the user will record some amount of content 410 during the performance of the work that is to be identified. Preferably this will be audio content. Note that this might done via a built-in microphone of the sort found on a cell phone, by a separate/separable external microphone that is in electronic communication with the portable device (e.g., via the microphone in a Bluetooth phone headset), or the audio might be sampled internally from a FM radio receiver, an AM radio receiver, streaming audio (e.g., from an Internet radio station), etc. In some embodiments, file types such as mp3, aac, wma, flac, ogg, vorbis, way, mpg, mp2, m4a, etc. will be accepted as input.

In a next preferred step the instant invention will calculate a fingerprint of the recorded content 420 within the portable device 200. This fingerprint will then be compared with the fingerprint records that have been previously computed 430 and stored in the fingerprint database on the portable device 200. In a next preferred step the instant invention will provide the result of the comparison step to the user 440, with the results of the fingerprint search potentially be further used as discussed hereinafter.

Figure 5:
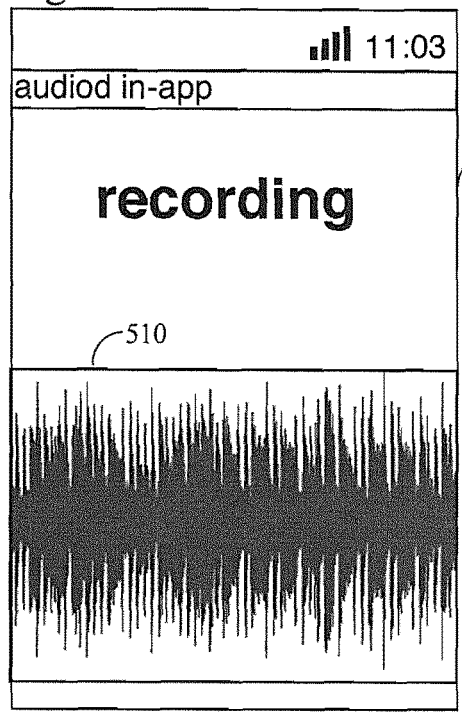
FIG. 5 shows a preferred graphical user interface of the instant invention as it might appear when providing the user with a negative result of the comparison process.

Turning next to FIG. 5, this figure displays an embodiment of a graphical user interface 500 of the instant invention as it might appear during the recording phase, wherein some portion of the recorded content 510 is displayed for the user as it is recorded. As discussed previously, this is the data 510 that will be analyzed and compared with the data stored in the local database.

Figure 6:
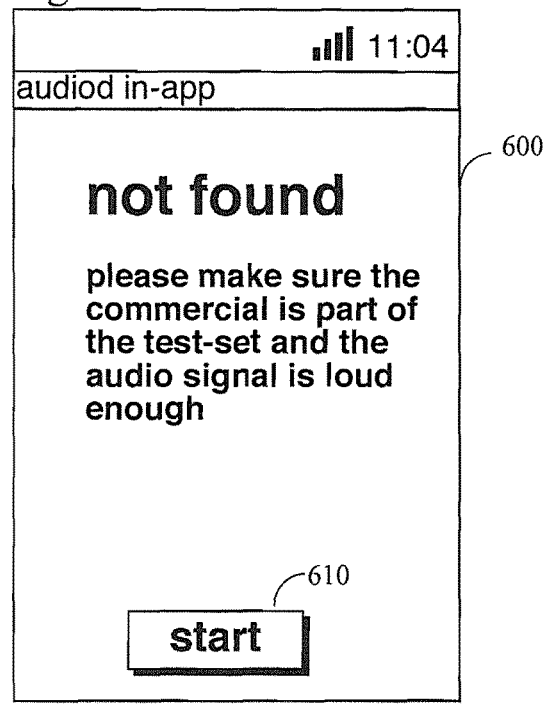
FIG. 6 shows a preferred graphical user interface of the instant invention as it might appear when providing the user with a positive result of the comparison process.

FIG. 6 shows an embodiment of a graphical user interface 600 of the instant invention after a negative result has been returned from a comparison of the recorded content with the fingerprint database. In this case, the user will preferably be informed about how to remedy possible problems with the fingerprint/database comparison process (e.g., get closer to the source, turn up the volume of the source, record a longer section of content, etc.). After the user has made the appropriate correction(s), the instant invention will preferably allow the user to try once again to recognize the song or other digital content, for example via an on-screen option such as the "start" control 610. Upon selection of that option, the instant invention will preferably restart the identification process.

Figure 7:
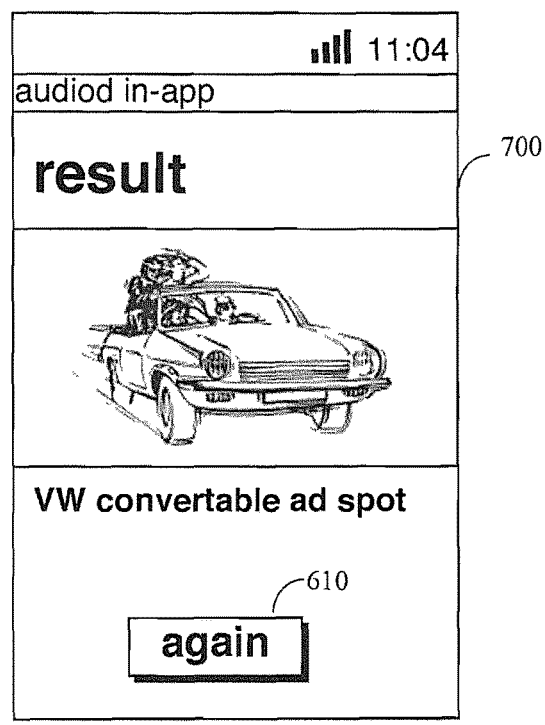
FIG. 7 illustrates a screen display that might be presented to the user after an audio work has been identified.

FIG. 7 shows a representative graphical user interface 700 of an embodiment of the instant invention after a positive comparison of the recorded content with the fingerprint database has been obtained. The user will be informed of the type of content from which the recorded content originates and by initiating the "start" control 610 the user will be able to start the identification process of the instant invention again.

In the preferred embodiment, the program that implements the instant invention will be resident on the portable device and be provided with a locally stored (i.e., within the portable device) database of fingerprints that were assembled on a remote server. In some cases the database will be downloaded onto the relevant device (e.g., via syncing) where it will be available for subsequent use. The database contents and/or search scope might be customized by the user in some embodiments (e.g., requesting that the search be limited to one genre such as "jazz") or not, depending on the user and the amount of storage available. Similar limitations might be instituted such as a date range (e.g., media items from the 1950s-1970s), current top 40 or current hits, etc. The instant invention, in some embodiments, might also be able to "learn" to identify audio works not previously stored in the database and, thereby, augment its own database. For example, if a song cannot be identified a user might be given an option to add such to the database in circumstances where, for example, another nearby user can identify the work or if the work is subsequently identified via a broadcast source that includes the title of the song, etc. That being said, in some preferred embodiments the largest database that can fit on the user's device or that the user will permit will be transmitted (either via a wired or wireless connection) to the user's device for storage thereon.

In some embodiments the instant invention will calculate a fingerprint of the audio work based on one or more of the following quantities: its tempo, a calculated melody, the frequency content (including spectral flatness, long and/ort short windows, etc.), number/frequency of zero crossings, key signature, time signature, pitch, vocal content (if available) including automatic speech recognition, instrument recognition (if available and possible), short time analysis results (e.g., amplitude spectrum of short time Fourier analysis, phase, spectrum) including a moving window analysis if appropriate, discriminant or other multivariate or univariate statistical analyses, etc. Such calculated values from the unknown audio work will then be compared with similar quantities that have been previously calculated for the known digital media items that are stored in the locally accessible database.

Preferably, the user will record or otherwise capture a short segment of the audio work that is to be identified, for example between about 1 and 10 seconds of data, but other arrangements are certainly possible and have been contemplated by the instant inventors. In some cases, some of the foregoing or other quantities will be preferred (e.g., given greater credibility or numerical weight) because of the nature of the work that is recorded, the quality of the performance, etc. Consider, for example, the differences in quality and recognizability of a song that is accessed digitally (e.g. where a song can be captured electronically from an over the air radio transmission or via Internet broadcast), versus a song that has been recorded from a high quality live performance (e.g. a song playing on a high-quality audio system or a song recorded at a live performance by a band), versus instances where the song has been recorded from a low quality source (e.g., where the digital work is voiced by a low quality speaker or it is sung or hummed by an individual, etc.). Of course, any of the foregoing performances might take place in a high noise or low noise environment.

In summary, the instant invention provides a revolutionary approach with respect to content recognition on portable devices. The generated fingerprint of the desired, recorded content is calculated on the portable device and this fingerprint is compared with fingerprints stored in a fingerprint database that is also stored on the portable device. This eliminates the need for a connection to (and the associated computer load on) a remote server during the recognition process.

Conclusions

Among the many advantages of the instant invention over prior art approaches are that, first, the instant invention will eliminate network or hardware bottlenecks of the sort that plague most current recognition approaches. Since the instant invention has its database stored locally in the phone or other portable device, large numbers of individuals can simultaneously be involved in audio identification without impacting the network. Additionally, the instant invention provides a better user experience since recognition times are short because matching takes place locally. Further, the instant architecture makes it easy to integrate the instant invention into existing applications. Finally, this approach makes traditional media more interactive and makes it possible to, for example, recognize commercials and other nonmusical types of audio.

Of course, many modifications and extensions could be made to the instant invention by those of ordinary skill in the art. For example in one preferred embodiment the instant invention will regularly connect to a remote server in order to automatically receive new fingerprints. In another preferred embodiment the user might be able to generate a personalized fingerprint database, for example when using the instant system for a scenario for controlling the portable device via speech.

Further note that when the term "database" is used herein, that term could refer to a single or multiple conventional or unconventional flat, hierarchical, etc., databases or, in some embodiments, a flat file or collection of files that taken together comprise a database. Those of ordinary skill in the art will readily be able to implement any of the numerous database forms that could be used with the instant invention.

Still further, it should be noted that when it is said that the instant invention seeks to match a calculated fingerprint with a fingerprint previously stored in the fingerprint database, it may not be required that the fingerprints match exactly. Depending on the application, the nature of the fingerprinting variables, etc., if the calculated fingerprint is close in some sense to a fingerprint in the database (e.g., within some numerical radius, matches to a predetermined percentage or probability level, etc.) the instant invention will signal the match. In short, in some embodiments the fingerprint will not need to match exactly in order to be communicated to the user as a "hit".

Even further, when the term "remote server" is used herein, that term should be broadly interpreted to include instances where the server is a single machine, as well as instances where the server is comprised of multiple computers that are interconnected via a network (e.g., via the Internet).

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of rewarding a user for listening to an audible commercial message, wherein is provided a fingerprint database loaded on a mobile computing device having a display and a microphone integral thereto, said fingerprint database comprising a plurality of audio fingerprints, each of said audio fingerprints being associated with an audio work, at least one of said fingerprints being associated with said audible commercial message, comprising the steps of:
   a. requiring the user to use said mobile computing device microphone to capture at least a portion of a user audio work within said mobile computing device;
   b. calculating an audio fingerprint from any part of said captured at least a portion of said user audio work;
   c. comparing said calculated audio fingerprint with said plurality of audio fingerprints within said fingerprint database;
   d. if said calculated audio fingerprint matches said fingerprint associated with said audible commercial message,
      (d1) transmitting an indicium from said mobile computing device to a remote server, said indicium indicating that said audible commercial message has been matched within said mobile computing device,
      (d2) transmitting from said remote server to said mobile computing device a coupon indicium, said indicium being associated with a number of bonus points, and,
      (d3) upon receipt of said coupon indicium by said mobile computing device, displaying on said mobile computing display device a message indicating a coupon has been received; and,
   e. if said calculated audio fingerprint does not match one of said audio fingerprints within said fingerprint database, using said display to communicate to the user that said calculated audio fingerprint could not be matched.

2. A method of rewarding a user for listening to an audible commercial message, wherein is provided a fingerprint database loaded on a mobile computing device having a display and a microphone integral thereto, said fingerprint database comprising a plurality of audio fingerprints, each of said audio fingerprints being associated with an audio work, at least one of said fingerprints being associated with said audible commercial message, comprising the steps of:
   a. requiring the user to use said mobile computing device microphone to record at least a portion of an audible user audio work within said mobile computing device;
   b. calculating an audio fingerprint from any part of said recorded at least a portion of said user audio work;
   c. comparing said calculated audio fingerprint with said plurality of audio fingerprints within said fingerprint database;
   d. if said calculated audio fingerprint matches said fingerprint associated with said audible commercial message,
      (d1) transmitting an indicium from said mobile computing device to a remote server, said indicium indicating that said audible commercial message has been matched within said mobile computing device,
      (d2) transmitting from said remote server to said mobile computing device a coupon indicium, said indicium being associated with a number of bonus points, and,
      (d3) upon receipt of said coupon indicium by said mobile computing device, displaying on said mobile computing display device a message indicating a coupon has been received; and,
   e. if said calculated audio fingerprint does not match one of said audio fingerprints within said fingerprint database, using said display to communicate to the user that said calculated audio fingerprint could not be matched.

3. A method of rewarding a user for viewing a video work containing an audible commercial message, wherein is provided a fingerprint database loaded on a mobile computing device having a display and a microphone integral thereto, said fingerprint database comprising a plurality of audio fingerprints, each of said audio fingerprints being associated with an audio work, at least one of said fingerprints being associated with said audible commercial message, comprising the steps of:
   a. requiring the user to use said mobile computing device microphone to record at least a portion of said audible commercial message within said mobile computing device while the user is viewing the video work;
   b. calculating an audio fingerprint from any part of said recorded at least a portion of said audible commercial message;
   c. comparing said calculated audio fingerprint with said plurality of audio fingerprints within said fingerprint database;

d. if said calculated audio fingerprint matches said fingerprint associated with audible commercial message,
 (d1) transmitting an indicium to a remote server, said indicium indicating that said audible commercial message has been matched,
 (d2) transmitting from said remote server to said mobile computing device a coupon indicium, and,
 (d3) upon receipt of said coupon indicium by said mobile computing device, displaying on said mobile computing display device a message indicating a coupon indicium has been received; and,
e. if said calculated audio fingerprint does not match one of said audio fingerprints within said fingerprint database, using said display to communicate to the user that said calculated audio fingerprint could not be matched.

* * * * *